(12) United States Patent
Aronovich et al.

(10) Patent No.: US 12,487,858 B2
(45) Date of Patent: Dec. 2, 2025

(54) OPTIMIZING RESOURCE UTILIZATION BASED ON QUOTA TREES IN RESOURCE SCHEDULING

(71) Applicant: International Business Machines Corporation, Armonk, NY (US)

(72) Inventors: Lior Aronovich, Thornhill (CA); Alaa S. Youssef, Valhalla, NY (US); Asser Nasreldin Tantawi, Somers, NY (US); Diana Jeanne Arroyo, Austin, TX (US); Marius Ion Danciu, Cluj-Napoca (RO)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 820 days.

(21) Appl. No.: 17/647,048

(22) Filed: Jan. 5, 2022

(65) Prior Publication Data

US 2023/0214267 A1     Jul. 6, 2023

(51) Int. Cl.
*G06F 9/50*     (2006.01)
*G06F 9/48*     (2006.01)

(52) U.S. Cl.
CPC .......... *G06F 9/5038* (2013.01); *G06F 9/4881* (2013.01)

(58) Field of Classification Search
CPC .............................. G06F 9/5038; G06F 9/4881
See application file for complete search history.

(56) References Cited

U.S. PATENT DOCUMENTS

| | | | |
|---|---|---|---|
| 7,788,357 B2 | 8/2010 | Riley et al. | |
| 8,924,364 B1 * | 12/2014 | Zhong | G06F 16/13 |
| | | | 707/821 |
| 9,110,729 B2 | 8/2015 | Arroyo et al. | |
| 9,697,045 B2 | 7/2017 | Amaral et al. | |
| 10,067,940 B2 | 9/2018 | Chhaunker et al. | |
| 10,110,506 B2 | 10/2018 | Kasso et al. | |
| 10,200,542 B2 | 2/2019 | Rolfe et al. | |
| 10,491,541 B2 * | 11/2019 | Dettori | H04L 47/82 |
| 10,805,237 B2 | 10/2020 | Dettori et al. | |

(Continued)

FOREIGN PATENT DOCUMENTS

| | | |
|---|---|---|
| CN | 106533982 B | 5/2019 |
| CN | 108809665 B | 11/2020 |

OTHER PUBLICATIONS

Mell et al., "The NIST Definition of Cloud Computing," Recommendations of the National Institute of Standards and Technology, NIST Special Publication 800-145, Sep. 2011, 7 pages.

*Primary Examiner* — Wissam Rashid
(74) *Attorney, Agent, or Firm* — Amin, Turocy & Watson, LLP

(57) ABSTRACT

Systems, computer-implemented methods, and computer program products to facilitate optimization of resource usage based on quota trees are provided. According to an embodiment, a system can comprise a processor that executes computer executable components stored in memory. The computer executable components comprise a determination component that determines one or more quota trees that classify a job request as inadmissible. The computer executable components further comprise an optimization component that optimizes resource usage to enable admissibility of the job request based on the one or more quota trees.

17 Claims, 10 Drawing Sheets

(56) References Cited

U.S. PATENT DOCUMENTS

2015/0372881 A1* 12/2015 Bellomo ............ H04L 41/5054
709/226
2018/0024892 A1 1/2018 Mutha et al.
2021/0173721 A1 6/2021 Sauvant

* cited by examiner

OPTIMIZING RESOURCE UTILIZATION BASED ON QUOTA TREES IN RESOURCE SCHEDULING

BACKGROUND

The subject disclosure relates to resource optimization, and more specifically, to optimizing resource utilization based on quota trees.

Use of cloud computing has great potential to address a variety of problems in a number of different domains. For example, cloud computing allows for a user or multiple users to utilize the computing power of distributed systems through multiple clusters of resources. Efficient sharing of computing resources among users can be achieved through the use of resource scheduling, that may also define quota limits on resource usage in order to prevent resource requests from exceeding their respective quota limits and thereby negatively impacting the ability of the computing system to service other job requests.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate optimizing resource utilization based on quota trees are described.

According to an embodiment, a system can comprise a processor that executes computer executable components stored in memory. The computer executable components comprise a determination component that determines one or more quota trees that classify a job request as inadmissible. The computer executable components further comprise an optimization component that optimizes resource usage to enable admissibility of the job request based on the one or more quota trees. An advantage of such a system is that it can enable the admissibly of job requests that would otherwise be inadmissible due the available resources and the resources that a job request calls for.

In some embodiments, the computer executable components can further comprise an ordering component that orders the one or more quota trees the job request is mapped to, based on at least one logical operation for evaluating the job request and a likelihood of the one or more quota trees to determine the job as admissible. An advantage of such a system is that it can enable greater efficiency in the optimization of resource usage.

According to another embodiment, a computer-implemented method can comprise determining, by a system operatively coupled to a processor, one or more quota trees that classify a job request as inadmissible. The computer-implemented method can further comprise optimizing, by the system, resource usage to enable admissibility of the job request based on the one or more quota trees. An advantage of such a computer-implemented method is that it can enable the admissibly of job requests that would otherwise be inadmissible due the available resources and the resources that a job request calls for.

In some embodiments, the above computer-implemented method can further comprise ordering, by the system, the one or more quota trees the job request is mapped to based, on at least one logical operation for evaluating the job request and a likelihood of the one or more quota trees to determine the job as admissible. An advantage of such a computer-implemented method is that it can enable greater efficiency in the optimization of resource usage.

According to another embodiment, a computer program product comprising a computer readable storage medium having program instructions embodied therewith, the program instructions executable by a processor to cause the processor to determine one or more quota trees that classify a job request as inadmissible. The program instructions are further executable by the processor to cause the processor to optimize resource usage to enable admissibility of the job request based on the one or more quota trees. An advantage of such a computer program product is that it can enable the admissibly of job requests that would otherwise be inadmissible due the available resources and the resources that a job request calls for.

In some embodiments, the program instructions are further executable by the processor to cause the processor to order the one or more quota trees the job request is mapped to, based on at least one logical operation for evaluating the job request and a likelihood of the one or more quota trees to determine the job as admissible. An advantage of such a computer program product is that it can enable greater efficiency in the optimization of resource usage.

DETAILED DESCRIPTION

Figure 1:
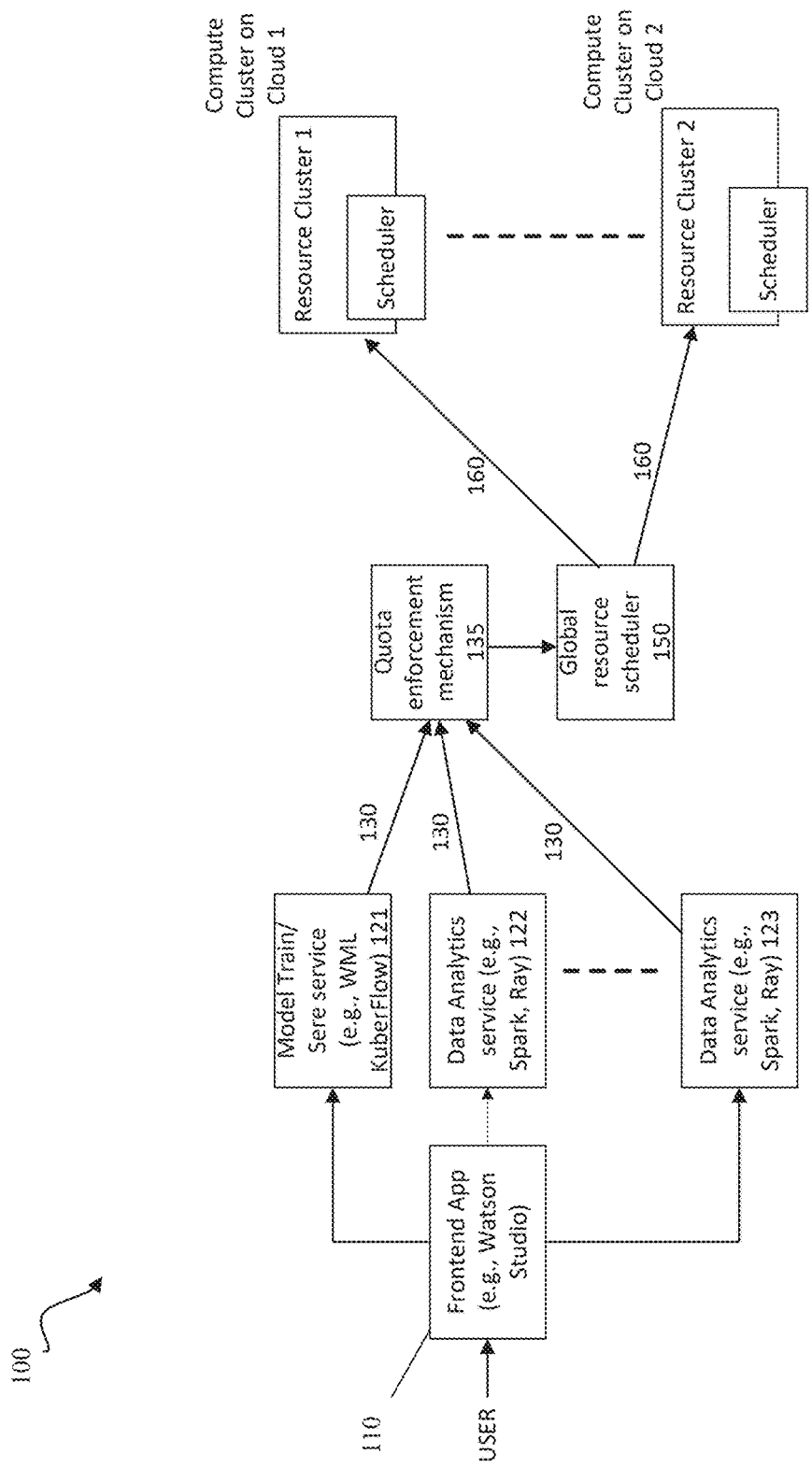
FIG. 1 illustrates a flow diagram of an example, non-limiting method that can facilitate receiving a job request for a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A problem with existing resource scheduling systems is that without proper optimization and given quota limits, job requests that are determined as inadmissible based on quota limits may remain in this state for long periods of time. Additionally, without optimization and given quota limits, the overall throughput of executing jobs may be significantly reduced. Further, without optimization and given quota limits, it is possible that more job requests will exceed quota limits, therefore preventing their execution.

Given problems described above with existing resource scheduling and optimization technologies, the present disclosure can be implemented to produce a solution to these problems in the form of systems, computer-implemented methods, and/or computer program products that can facilitate optimizing resource utilization based on quota trees by: determining one or more quota trees that classify a job request as inadmissible; and/or optimizing resource usage to enable admissibility of the job request based on the one or more quota trees. An advantage of such systems, computer-implemented methods, and/or computer program products is that they can be implemented to enable the admissibly of job requests that would otherwise be inadmissible due the availability of resources, the resource consumption of other jobs requests, and the resources that a job request calls for.

In some embodiments, the present disclosure can be implemented to produce a solution to the problems described above in the form of system, computer-implemented methods, and/or computer program products that can further facilitate optimizing resource utilization based on quota trees by: ordering the one or more quota trees the job request is mapped to, based on at least one logical operation for evaluating the job request and a likelihood of the one or more quota trees to determine the job request as admissible. An advantage of such systems, computer-implemented methods, and/or computer program products is that they can be implemented to enable greater efficiency in the optimization of resource usage.

In a shared cloud system used by multiple users, enforcing quota limits on users' resource consumption is typically used to ensure effective performance and quality of service for the plurality of users. In some embodiments, a shared cloud system can comprise of multiple clusters of resources obtained from potentially multiple providers. Quota limits can be defined to apply in different contexts, also referred to as scope properties. For example, global quota limits can apply to users' overall resource consumption regardless of from which resource cluster these resources are obtained. In another example, local quota limits can apply to users' resource consumption from specific resource groups, specific resource clusters, and/or specific cloud platforms. Furthermore, service oriented quota limits can apply limits on the resource consumption of specific services, or on users' resource consumption from specific services, either globally or locally. Examples of such services can include: AI model training and serving services, big data analytics services, and others.

In order to express hierarchies of limits, quota limits can be represented as quota trees, wherein the limits and actual consumption values specified for a parent node encompass the limits and actual consumption values specified for all its descendent nodes. As such, multiple hierarchies can be defined to be considered simultaneously. For example, hierarchies can represent organizational hierarchies, such as user groups, departments, divisions, organizational functions, projects, funding units etc., while other hierarchies can represent technical hierarchies, such as computer services, resource groups, data centers, etc. Quota limits can be defined to express limits for multiple resource types such as a computer processing unit, a graphical processing unit, a memory unit, a storage unit, and/or other computer resource types. Quota limits can also be permitted to express borrowing operations between sibling nodes and/or between a node and its parent node.

In order to enforce quota limits, a system, such as systems 200 and 300 described in greater detail below, can accept a configuration of multiple quota limit hierarchies as specified above, and given an incoming job deemed as inadmissible, optimize resource consumption to enable admissibility of the job request. Such a system would typically be included in a control plane of a cloud based system, and can, for example, intermediate between services that generate jobs and resource clusters. Namely, in a first step, an incoming job can be checked using a quota enforcement mechanism to determine admissibility, and if admissible, in a next step the job is forwarded to a layered resource scheduling mechanism for processing. If a job request is deemed as inadmissible, then an optimization process can be performed to enable admissibility of the job request.

FIG. 1 illustrates a flow diagram 100 of an example, non-limiting method that can facilitate receiving a job request for a cloud computing environment in accordance with one or more embodiments described herein.

As shown, at 110 a user can request to use a service within a cloud computing system through an application. For example, a user may use an application that triggers the use of a service within the cloud based system such as services 121, 122, and/or 123.

At 130, a service, such as services 121, 122, and/or 123 can send a job request, to be performed with cloud resources, to a quota enforcement mechanism 135 which can determine admissibility of the job request.

At 140, the quota enforcement mechanism 135 can pass an admissible job request to a global resource scheduler 150. If a job request is inadmissible, then quota enforcement mechanism 135 can perform an optimization process to enable admissibility.

At 160, the global resource scheduler 150 can signal a resource cluster to perform the job request based on what resources the job request will use and what resources are available to perform the job request.

Figure 2:
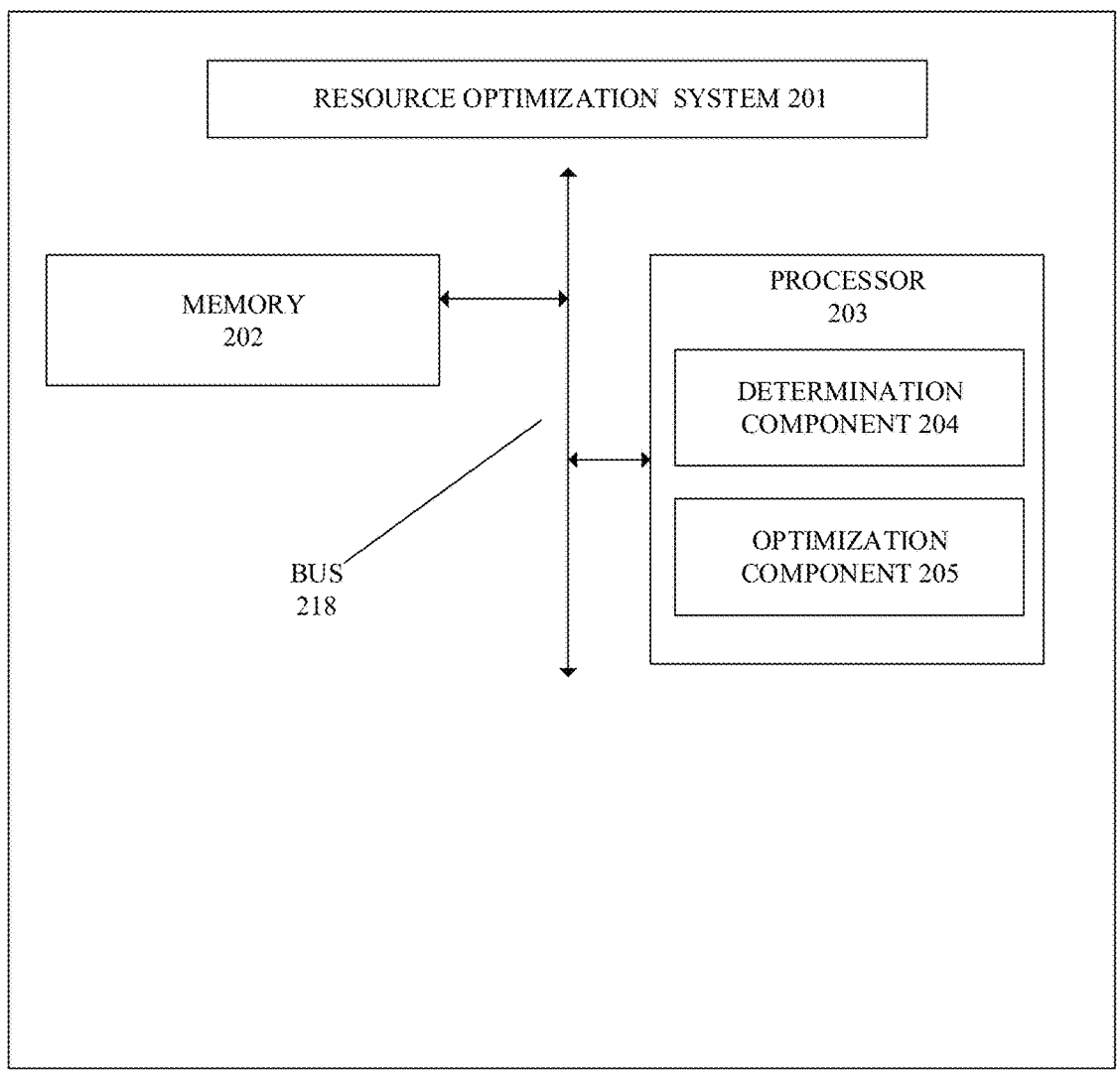
FIG. 2 illustrates a block diagram of an example, non-limiting system that can facilitate optimization of resource usage based on quota trees in accordance with one or more embodiments described herein.
Figure 3:
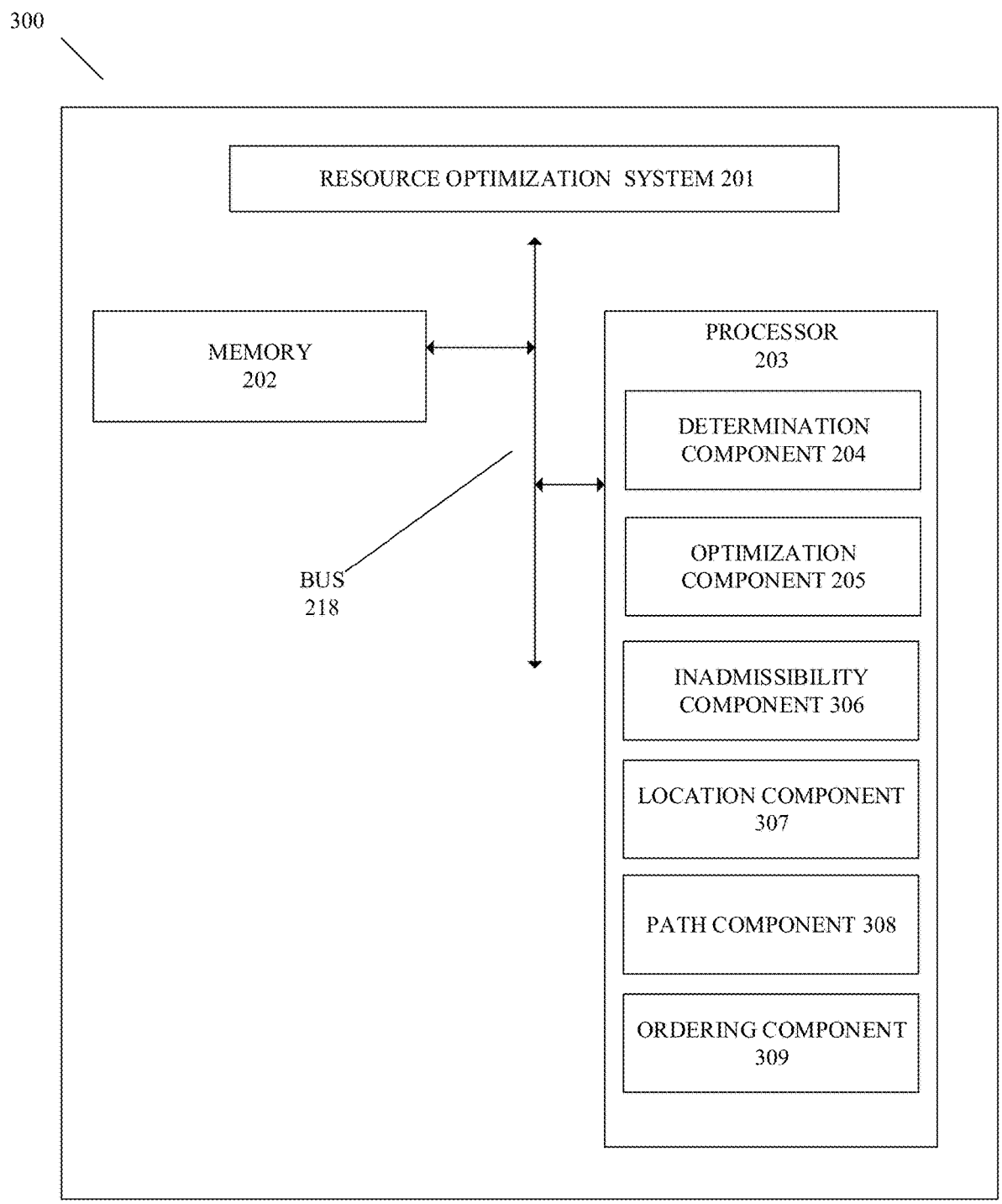
FIG. 3 illustrates a block diagram of an example, non-limiting system that can facilitate optimization of resource usage based on quota trees in accordance with one or more embodiments described herein.

FIGS. 2 and 3 illustrates block diagrams of example, non-limiting systems 200 and 300, respectively, that can facilitate optimization of resource usage based on quota trees. System 200 can comprise resource optimization system 201. Resource optimization system 201 of system 200 can comprise a memory 202, a processor 203, a determination component 204, an optimization component 205, and/or a bus 218. Resource optimization system 201 of system 300 depicted in FIG. 3 can further comprise, an inadmissibility component 306, a location component 307, a path component 308, and/or and ordering component 309.

It should be appreciated that the embodiments of the subject disclose depicted in various figures disclosed herein are for illustration only, and as such, the architecture of such embodiments are not limited to the systems, devices, and/or components depicted therein. For example, in some embodiments, system 200 and/or resource optimization system 201 can further comprise various computer and/or computing-based elements described herein with reference to operating environment 900 and FIG. 9. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 202 can store one or more computer and/or machine readable, writable, and/or executable components and/or instructions that, when executed by processor 203 (e.g., a classical processor, a quantum processor, and/or another type of processor), can facilitate performance of operations defined by the executable component(s) and/or instruction(s). For example, memory 202 can store computer and/or machine readable, writable, and/or executable components and/or instructions that, when executed by processor 203, can facilitate execution of the various functions described herein relating to resource optimization system 201, determination component 204, optimization component 205, inadmissibility component 306, location component 307, path component 308, ordering component 309, and/or another component associated with resource optimization system 201.

Memory 202 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 202 are described below with reference to system memory 916 and FIG. 9. Such examples of memory 202 can be employed to implement any embodiments of the subject disclosure.

Processor 203 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 202. For example, processor 203 can perform various operations that can be specified by such computer and/or machine readable, writable, and/or executable components and/or instructions including, but not limited to, logic, control, input/output (I/O), arithmetic, and/or the like. In some embodiments, processor 203 can comprise one or more central processing unit, multi-core processor, microprocessor, dual microprocessors, microcontroller, System on a Chip (SOC), array processor, vector processor, quantum processor, and/or another type of processor. Further examples of processor 203 are described below with reference to processing unit 914 and FIG. 9. Such examples of processor 203 can be employed to implement any embodiments of the subject disclosure.

Resource optimization system 201, memory 202, processor 203, determination component 204, optimization component 205, inadmissibility component 306, location component 307, path component 308, ordering component 309, and/or another component of resource optimization system 201 as described herein can be communicatively, electrically, operatively, and/or optically coupled to one another via bus 218 to perform functions of system 200, system 300, resource optimization system 201, and/or any components coupled therewith. Bus 218 can comprise one or more memory bus, memory controller, peripheral bus, external bus, local bus, a quantum bus, and/or another type of bus that can employ various bus architectures. Further examples of bus 218 are described below with reference to system bus 918 and FIG. 9. Such examples of bus 218 can be employed to implement any embodiments of the subject disclosure.

Resource optimization system 201 can comprise any type of component, machine, device, facility, apparatus, and/or instrument that comprises a processor and/or can be capable of effective and/or operative communication with a wired and/or wireless network. All such embodiments are envisioned. For example, resource optimization system 201 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Resource optimization system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, resource optimization system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, resource optimization system 201 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Resource optimization system 201 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, resource optimization system 201 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between resource optimization system 201 and external systems, sources, and/or devices (e.g., computing devices, communication devices, and/or another type of external system, source, and/or device).

Resource optimization system 201 can comprise one or more computer and/or machine readable, writable, and/or executable components and/or instructions that, when executed by processor 203 (e.g., a classical processor, a quantum processor, and/or another type of processor), can facilitate performance of operations defined by such component(s) and/or instruction(s). Further, in numerous embodiments, any component associated with resource optimization system 201, as described herein with or without reference to the various figures of the subject disclosure, can comprise one or more computer and/or machine readable, writable, and/or executable components and/or instructions that, when executed by processor 203, can facilitate performance of operations defined by such component(s) and/or instruction(s). For example, determination component 204, optimization component 205, inadmissibility component 306, location component 307, path component 308, ordering component 309, and/or any other components associated with resource optimization system 201 as disclosed herein (e.g., communicatively, electronically, operatively, and/or optically coupled with and/or employed by resource optimization system 201), can comprise such computer and/or machine readable, writable, and/or executable component(s) and/or instruction(s). Consequently, according to numerous embodiments, resource optimization system 201 and/or any components associated therewith as disclosed herein, can employ processor 203 to execute such computer and/or machine readable, writable, and/or executable component(s) and/or instruction(s) to facilitate performance of one or more operations described herein with reference to resource optimization system 201 and/or any such components associated therewith.

Resource optimization system 201 can facilitate (e.g., via processor 203) performance of operations executed by and/or associated with determination component 204, optimization component 205, inadmissibility component 306, location component 307, path component 308, and/or ordering component 309 as disclosed herein. For example, as described in detail below, resource optimization system 201 can facilitate (e.g., via processor 203): determining one or more quota trees that classify a job request as inadmissible, and/or optimizing resource usage to enable admissibility of the job request based on the one or more quota trees.

Determination component 204 can determine one or more quota trees that classify a job request as inadmissible. For example, determination component 204 can receive a job request that is deemed as inadmissible based on quota limits. A job request is deemed admissible with respect to a single quota tree if the job request is admissible with respect to all the paths from the leaf nodes of the quota tree the job request is mapped to, to the root of the quota tree. A job is admissible with respect to a specific path in a quota tree if adding the resources called for by the job request to all the leaf nodes on the path from the leaf node to the root of the quota tree does not exceed the limits specified in all nodes on the path. In other words, a job request is inadmissible with respect to a single quota tree if there is a path within the quota tree from a leaf node the job request is mapped to, to a root of the quota tree, wherein adding the resources called for by the job request would exceed limits specified in at least one node on the path. A job request is inadmissible with respect to multiple quota trees based on a logical operation. For example, if the job request calls for a logical operation of an AND operator, then the job request is admissible if it is admissible with respect to all quota trees the job request is mapped to. In another example, if the logical operation is an OR operator, then the job request is admissible if the job request is admissible with respect to at least one quota tree the job request is mapped to. As such, the determination component can use the logical operation of the job request to assist in determination of one or more quota trees that deem the job as inadmissible. For example, if the logical operation is OR, then determination component 204 can determine that the job request is inadmissible with regard to all quota trees it is mapped to, as if the job request was admissible to at least one quota tree, the job request as a whole would be admissible. In an embodiment, if the logical operation was AND, then determination component 204 can check the admissibility of each quota tree the job request is mapped to in order to determine which one or more quota trees the job request is inadmissible with respect to. In another embodiment, when determination component 204 receives a job request deemed as inadmissible, determination component 204 can also receive a list of quota trees that the job request was deemed inadmissible for during an admissibility determination process.

Ordering component 309 can order the one or more quota trees the job request is mapped to, based on at least one logical operation for evaluating the job request on the one or more quota trees and a likelihood of the one or more quota trees to determine the job as admissible. For example, ordering component 309 can receive a set of quota trees that classify the job request as inadmissible as determined by determination component 204. If the logical operation for the job request is OR, then ordering component 309 can order the one or more quota trees in descending likelihood to accept the job request after optimization. The rational is that as OR deems a job request as admissible as long as the job request is deemed admissible based on at least one quota tree is, it will be more efficient to optimize resource usage on a quota tree that is more likely to accept the job as admissible after optimization, and thereby satisfy the OR operation. If the logical operation for the job request is AND, then ordering component 309 can order the one or more quota trees in descending likelihood to reject the job request after optimization. The rational is that as AND deems a job request as admissible if all quota trees are admissible, it will be more efficient to focus optimization first on the quota trees that likely call for more optimization. The likelihood of acceptance after optimization can depend on aspects such as the resources called for by the job request, the job request's priority level, the level in which resources are already consumed in the quota trees, and/or the resource usage of other job requests and the priority of other job requests mapped to the quota trees. For example, the difference between the level of resources already in use of a quota tree and the resource limit of the quota tree can be used to determine likelihood. In this example, a quota tree with a larger difference between resource usage and the resource limit (e.g., more available resources) is more likely to admit the job request as admissible after optimization than a quota tree with a smaller difference between resource usage and the resource limit (e.g., fewer available resources). In another example, likelihood can be based on the difference between the available resources of a quota tree and the resources called for by the job request, the rational being that the smaller the difference, the more likely it is that optimization will enable admissibility.

Optimization component 205 can optimize resource usage to enable admissibility of the job request based on the one or more quota trees that classify the job request as inadmissible. In an embodiment, optimization component 205 can optimize resource usage based on borrowing resource quota. For example, optimization component 205 can receive a quota tree for which the job request is inadmissible for and a leaf node the job request is mapped to. Optimization component 205 can then try to borrow unused resource quota from other nodes in the quota tree. For example, optimization component 205 can borrow unused resource quota from sibling nodes, parent nodes, and/or grandparent nodes. Optimization component 205 can borrow unused resource quota from any node as long as the borrowing is consistent with the hierarchical structure of the quota tree. For example, if a sibling node of the leaf node has unused resource quota that satisfies the difference between the available resources of the leaf node and the resources called for by the job request, then optimization component 205 can map a portion of the job request's called for resources to the sibling node to enable admissibility. It should be appreciated that optimization component 205 can borrow unused resource quota from multiple other nodes within the quota tree. In an embodiment, optimization component 205 can order nodes to borrow from based on priority metrics of the job requests mapped to the nodes. For example, nodes that have job requests with an average lower priority level can be borrowed from before nodes that have job requests with an average higher priority level.

In an embodiment, optimization component 205 can optimize resource usage based on pre-empting other job requests. For example, optimization component 205 can locate information on other job requests mapped to the leaf node the job request is mapped to. From these jobs, optimization component 205 can select the jobs whose priority is less than or equal to the job request. Optimization component 205 can then order the other jobs by a metric that combines their priority and relative amount of resources consumed. For example, optimization component 205 can prefer to pre-empt job requests that have low priority and high resource consumption as pre-empting these jobs is more likely to enable admissibility of the job request. Based on this ordering, optimization component 205 can determine the minimum number of jobs whose pre-emption will provide sufficient resources to enable admissibility of the job request. Optimization component 205 can then add the selected jobs, based on the determined minimum number of jobs, to a list of job requests for pre-emption to enable admissibility of the job request. In an embodiment, optimization component 205 can utilize both borrowing and pre-emption. For example, optimization component 205 can first attempt to optimize using borrowing. If borrowing fails to enable admissibility, then optimization component 205 can utilize pre-emption.

Inadmissibility component 306 can determine one or more paths which are inadmissible for the one or more quota trees which classify the job request as inadmissible. For example, inadmissibility component 306 can receive a list of quota trees that classify the job request as inadmissible from determination component 204. Using a tree traversal algorithm, inadmissibility component 306 can determine a path from each node the job request is mapped to in a quota tree to the root of the quota tree.

Location component 307 can locate the leaf nodes on the one or more paths for which the job request is inadmissible. For example, location component 307 can receive a set of paths for which the job request is inadmissible from inadmissibility component 306. Using a tree traversal algorithm, location component 307 can locate the leaf node on each path that determines the job request as inadmissible. As a quota tree is a hierarchical structure, identifying this leaf node can help facilitate optimization.

Path component 308 can process a path from the leaf node to a root of a quota tree. For example, path component 308 can receive a list of leaf nodes and paths from inadmissibility component 306 and location component 307. Path component 308 can then pass the leaf node on a path to optimization component 205, which can optimize resource usage to enable admissibility at the leaf node. If optimization component 205 is successful in optimization of the leaf node, then path component 308 can mark the leaf node as resolved and signal optimization component 205 to optimize the parent node of the leaf node. This process can then repeat until optimization component 205 has optimized to the root of the quota tree.

Figure 4:
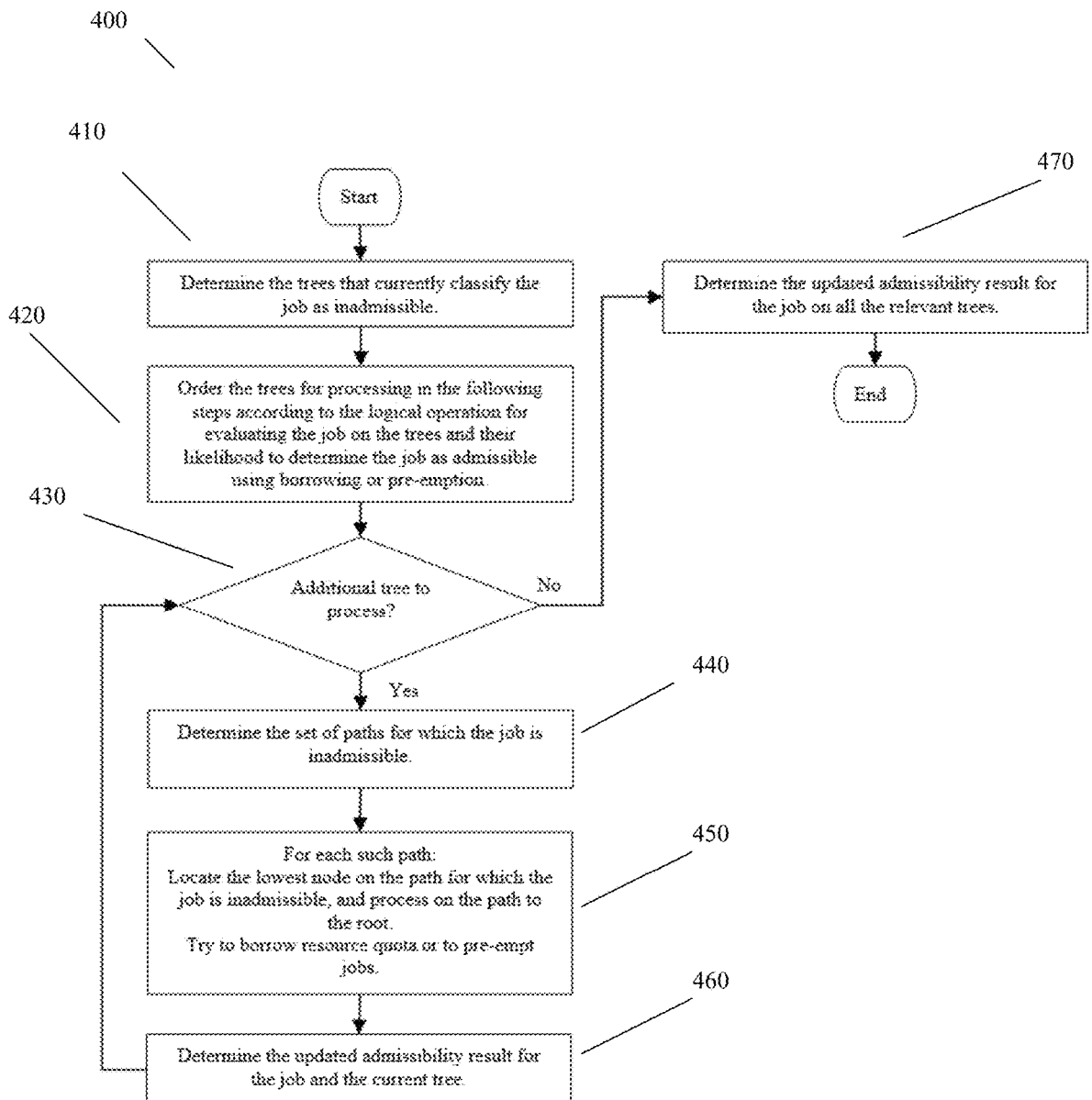
FIG. 4 illustrates a flow diagram of an example, non-limiting computer-implemented method that can facilitate optimization of resource usage based on quota trees in accordance with one or more embodiments described herein.
Figure 5:
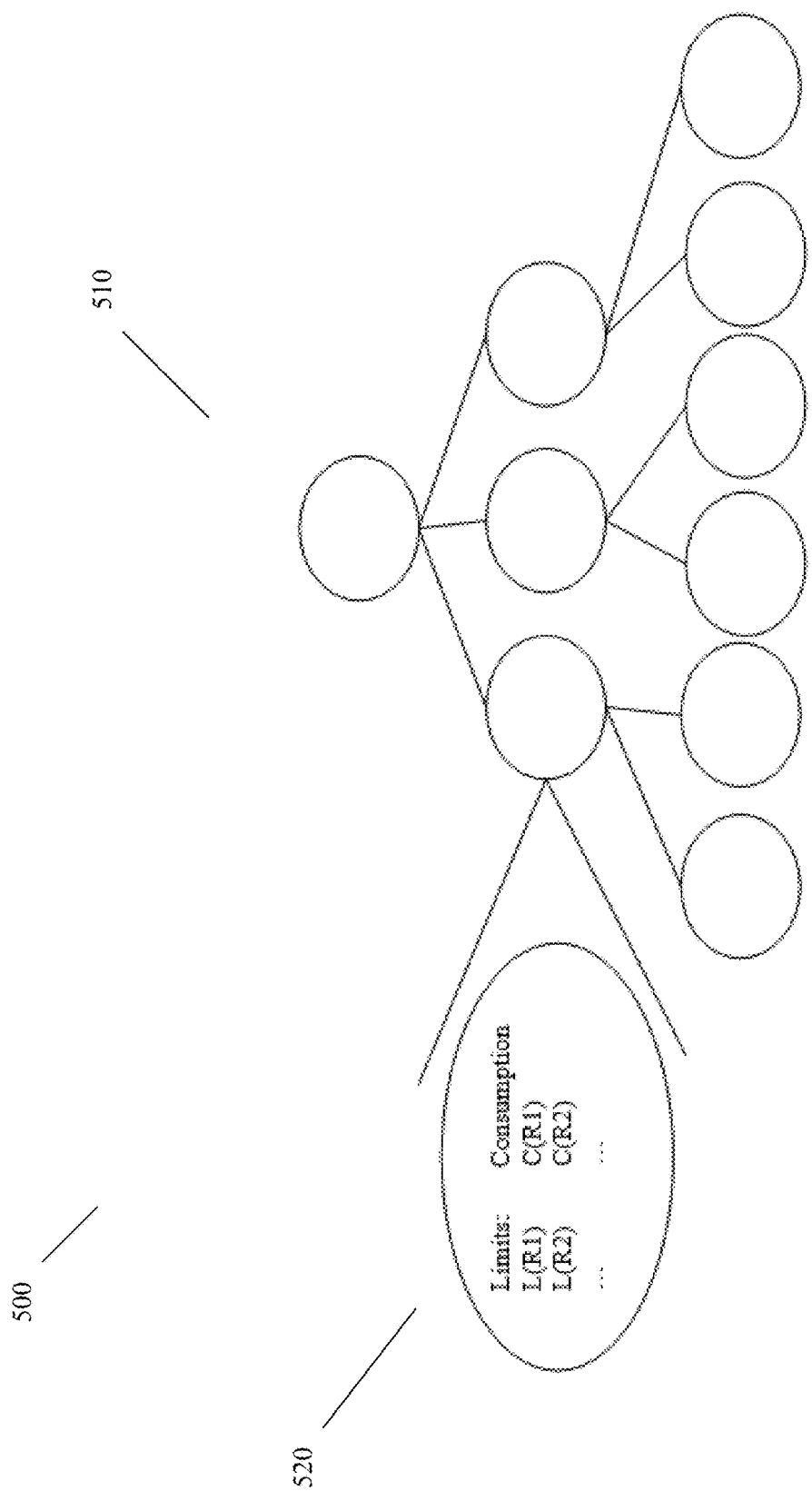
FIG. 5 illustrates a diagram representation of an example, non-limiting single quota tree in accordance with one or more embodiments described herein.
Figure 6:
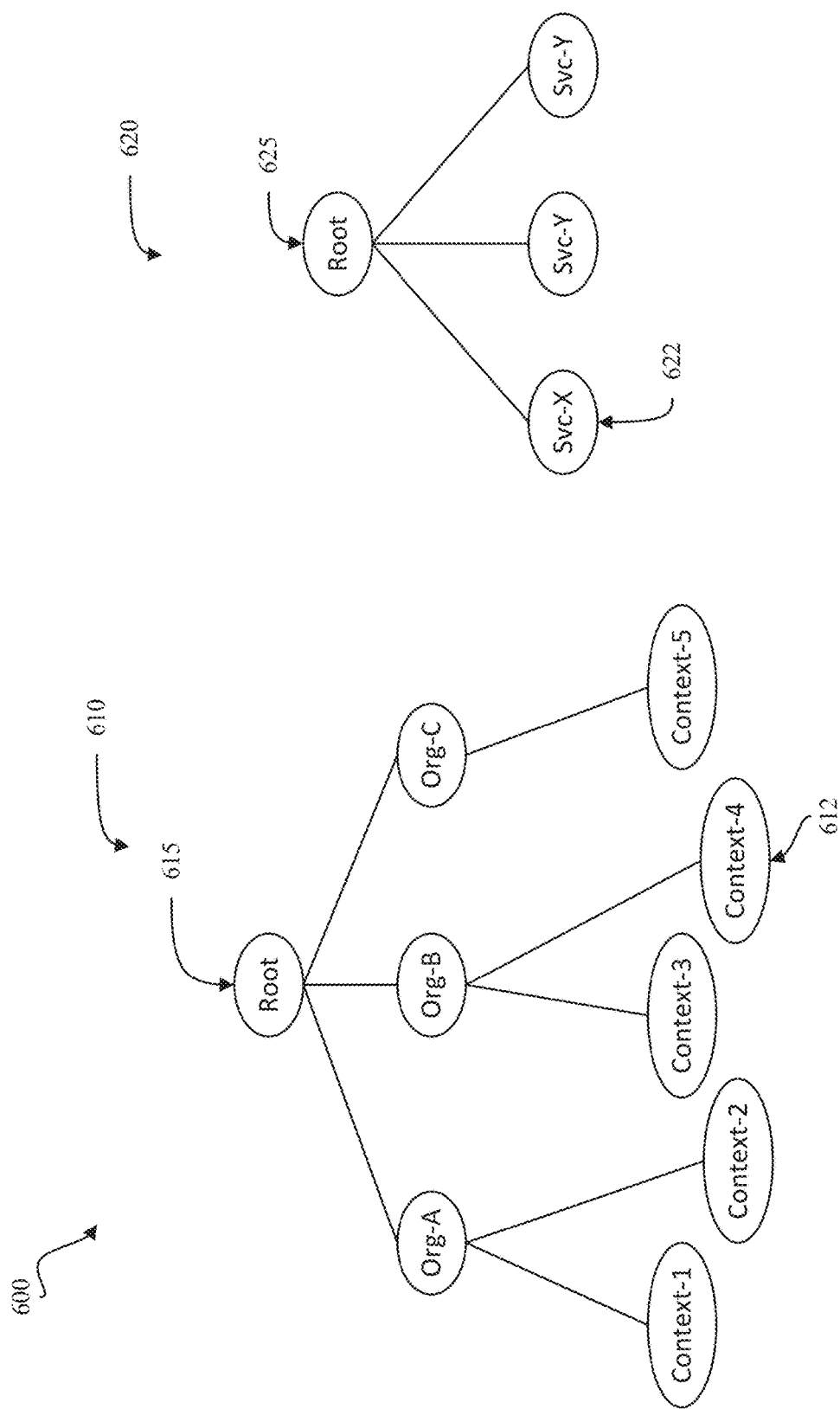
FIG. 6 illustrates a diagram representation of example, non-limiting multiple quota trees in accordance with one or more embodiments described herein.

FIG. 4 illustrates a flow diagram of an example, non-limiting computer-implemented method 400 that can facilitate optimization of resource usage based on quota trees in accordance with one or more embodiments described herein.

At 410, computer-implemented method 400 can comprise determining, by a system (e.g., resource optimization system 201 and/or determination component 204) operatively coupled to a processor (e.g., processor 203), quota trees that currently classify the job request as in admissible.

At 420, computer-implemented method 400 can comprise ordering, by the system (e.g., resource optimization system 201 and/or ordering component 309), the quota trees for processing according to the logical operation for evaluating the job request on the quota trees and their likelihood to determine the job as admissible. For example, as described above in reference to FIGS. 2 and 3, if the logical operation is AND, ordering component 309 can order the quota trees by descending likelihood to reject the job request, and if the logical operation is OR, ordering component 309 can order the quota trees by descending likelihood to accept the job request.

At 430, computer-implemented method 400 can comprise determining, by the system (e.g., resource optimization system 201 and/or optimization component 205), if there are additional quota trees to optimize. For example, if optimization component 205 has already optimized all of the quota trees that classify the job request as inadmissible, then computer-implemented method 400 can proceed to step 470. If there are additional quota trees which optimization component 205 has not optimized, then computer-implemented method 400 can proceed to step 440.

At 440, computer-implemented method 400 can comprise determining, by the system (e.g., resource optimization system 201 and/or inadmissibility component 306), a set of one or more paths which classify the job request as inadmissible for a selected quota tree.

At 450, computer-implemented method 400 can comprise for each path of the one or more paths, locating, by the system (e.g., resource optimization system 201 and/or location component 307), the leaf node on the path for which the job is inadmissible. For the leaf node, optimization component 205 can then optimize resource usage at the leaf node through trying to borrow resource quota to enable admissibility at the leaf node and/or trying to pre-empt other job requests mapped to the leaf node. If the optimization is successful, then optimization component 205 can mark the leaf node as resolved and path component 308 can signal optimization component 205 to attempt optimization on the parent node of the leaf node on the path to the root. Path component 308 and optimization component 205 can continue this iterative optimization on the nodes on the path to the root until the root node of the selected quota tree is marked as resolved. Optimization component 205 can then continue the optimization process for each of the one or more paths in the selected quota tree. After each path has been optimized, optimization component 205 can proceed to step 460. If optimization component 205 is unsuccessful, then optimization component can undue any optimization changes made to the selected quota tree and mark the path as unresolved. Optimization component 205 can then stop the optimization process and proceed to step 460.

At step 460, computer-implemented method 400 can comprise determining, by the system (e.g., resource optimization system 201 and/or determination component 204), the updated admissibility of the job request on the selected quota tree. For example, if each of the one or more paths was successfully resolved at step 450, then the job request is now admissible based on the selected quota tree, while if any of the one or more paths are marked as unresolved, then the job request is admissible based on the selected quota tree.

At step 470, computer-implemented method 400 can comprise determining, by the system (e.g., resource optimization system 201 and/or determination component 204), the updated admissibility result for the job request on all the quota trees which previously classified the job request as inadmissible. For example, if the logical operation of the job request is AND, then the job request will be admissible if the job request is admissible with respect to each quota tree after optimization. If the logical operation of the job request is OR, then the job request will be admissible if the job request is admissible with respect to at least one quota tree after optimization. In an embodiment, this determination can also be completed at step 460. For example, if the logical operation is OR, and a quota tree is determined as amissible at step 460, then the optimization process can be stopped, and the job request deemed admissible as the job request is admissible with respect to at least one quota tree. In another example, if the logical operation is AND, and a quota tree is determined as inadmissible at step 460, then the optimization process can be stopped, and the job request deemed inadmissible as the job request is not admissible with respect to all of the quota trees. If the job request is deemed admissible overall, then job request can be scheduled and performed. If the job request is deemed inadmissible, the job request can be placed in a queue, and the optimization process can be attempted again at a later time.

Diagram 500 comprises quota tree 510 which comprises multiple nodes, such as node 520. Quota tree 510 can be a representation of quota specification with the following properties. Each node of quota tree 510 can specify quota limits for a set of resources $R_1$ through $R_n$, (e.g., computer processing unit (CPU), graphical processing unit (GPU), memory, storage, etc.), denoted as $L(R_1)$ through $L(R_n)$ and can track actual consumption for each of these resources, denoted as $C(R_1)$ through $C(R_n)$. For example, node 520 contains limits for resources $R_1$ and $R_2$ ($L(R_1)$ and $L(R_2)$) and actual consumption ($C(R_1)$ and $C(R_2)$). Quota tree 510 can express a hierarchy, using the tree structure, in which the aggregated limit values and aggregated actual consumption values specified for all the direct descendent nodes of a parent node do not exceed the limit values and actual consumption values specified for the parent node. Additionally, quota tree 510 can have properties that pertain to the entire tree. For example, quota tree 510 can have a scope property that specifies if the tree is applicable globally, or otherwise applicable to specific clusters, or to specific groups of hosts within one or more clusters. Quota tree 510 can also have any additional properties.

A job request can be mapped to multiple leaves within quota tree 510. For example, if quota tree 510 represents an organizational hierarchy, a job request may be owned jointly by multiple users, where each user is represented by a separate leaf node in quota tree 510. In another example, if quota tree 510 represents a computer services hierarchy, a job request may consume resources from multiple services, wherein each resource is represented by a separate leaf node in quota tree 510. The consumption of resources a job calls for can be different with respect to each leaf node in quota tree 510 that it maps to. For example, a job request that is jointly owned by users U1 and U2 may apply for example with 60% proportion to the quotas of U1 and with 40% proportion to the quotas of U2. As such, optimization component 205 can use proportions as part of a borrowing operation. For example, optimization component 205 can mark a proportion of a job request to a node that has resources available for borrowing.

A job request is admissible with respect to quota tree 510 if the job request is admissible with respect to all the paths from the nodes the job request maps to, to the root of the tree. The job request is admissible with respect to a specific path in a quota tree if adding the resource consumption of the job request, for all the resources, calculated (using the associated proportion) for the node of this path to all the nodes on the path from the node to the root does not exceed the limits specified on all the nodes in the path. Namely, this is an AND operation on all the paths in quota tree 510 that the job request maps to. If a job is admissible, its resource consumptions are added to all the nodes on all the paths from the nodes the job request maps to in quota tree 510.

Diagram 600 comprise two quota trees, context tree 610 and service tree 620. Context tree 610 represents an organizational structure while service tree 620 represents various services. As such, a job request can be mapped to both context tree 610 and service tree 620. For example, a user that initiates the job request can belong to the organizational structure represented by context tree, and thus the job request can be mapped to a leaf node representing the user such as leaf node 612. If the job request is admissible on each node on the path from leaf node 612 to root 615, then the job request is admissible with respect to context tree 610. If the job request is not admissible with respect to context tree 610, then an optimization operation such as that described in detail in reference to FIG. 4 can be applied depending on the logical operation the job request calls for and the admissibility with respect to other quota trees the job request is mapped to. In this example, the job request can also call for the use of a service and thus be mapped to service tree 620. For example, depending on the service called for by the job request, the job request can be mapped to leaf node 622 representing the service called for. If the job request is admissible on each node on the path from leaf node 622 to root 625, then the job request is admissible with respect to service tree 620. If the job request is not admissible with respect to service tree 620, then an optimization operation such as that described in detail in reference to FIG. 4 can be applied depending on the logical operation the job request calls for and the admissibility with respect to other quota trees the job request is mapped to.

Figure 7:
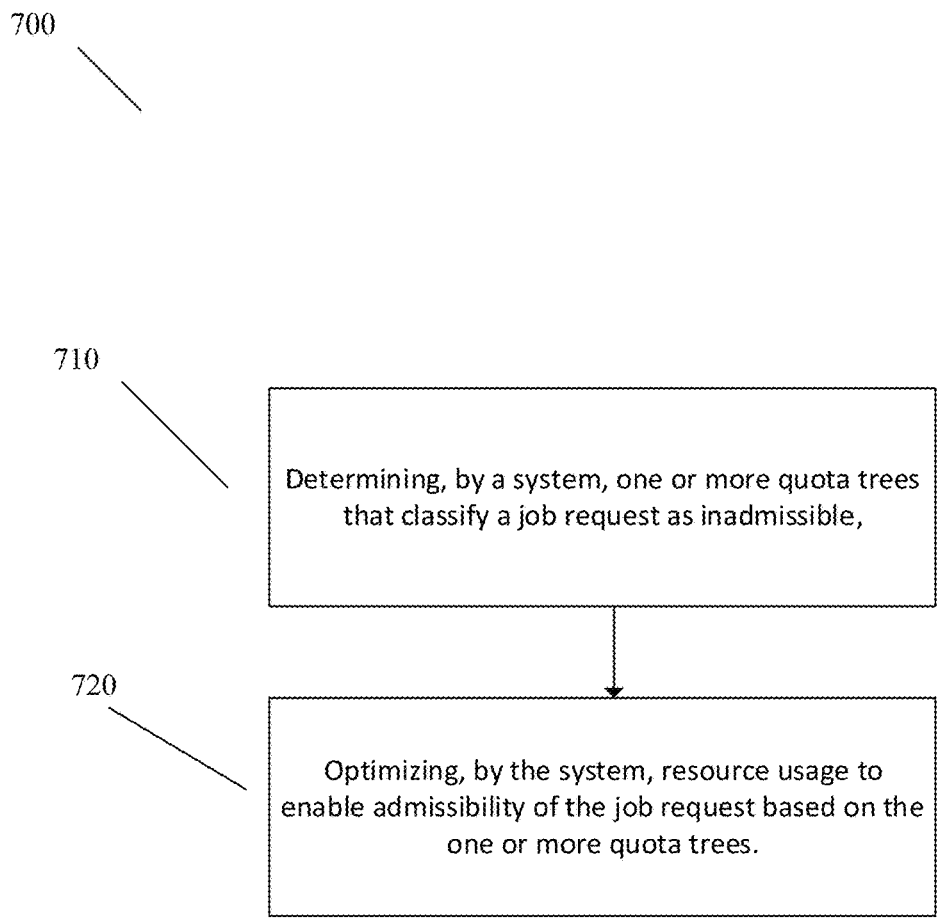
FIG. 7 illustrates a flow diagram of an example, non-limiting computer-implemented method that can facilitate optimization of resource usage based on quota trees in accordance with one or more embodiments described herein.

FIG. 7 illustrates a flow diagram of an example, non-limiting computer-implemented method 700 that can facilitate optimization of resource usage based on quota trees in accordance with one or more embodiments described herein. Repetitive description of like elements and/or processes employed in respective embodiments is omitted for sake of brevity.

At 710, computer-implemented method 700 can comprise determining, by a system (e.g., resource optimization system 201 and/or determination component 204) operatively coupled to a processor (e.g., processor 203), one or more quota trees that classify a job request as inadmissible.

At 720, computer-implemented method 700 can comprise optimizing, by the system (e.g., resource optimization system 201 and/or optimization component 205), resource usage to enable admissibility of the job request based on the one or more quota trees. For example, as described above in reference to FIGS. 2-4, optimization component 205 can perform an optimization process by borrowing resource quota from sibling nodes and/or parent nodes of a node a job request is mapped to in the one or more quota trees. In another example, optimization component 205 can perform an optimization process by pre-empting other job requests mapped to the same node as the job request in order to enable admissibility of the job request.

Figure 8:
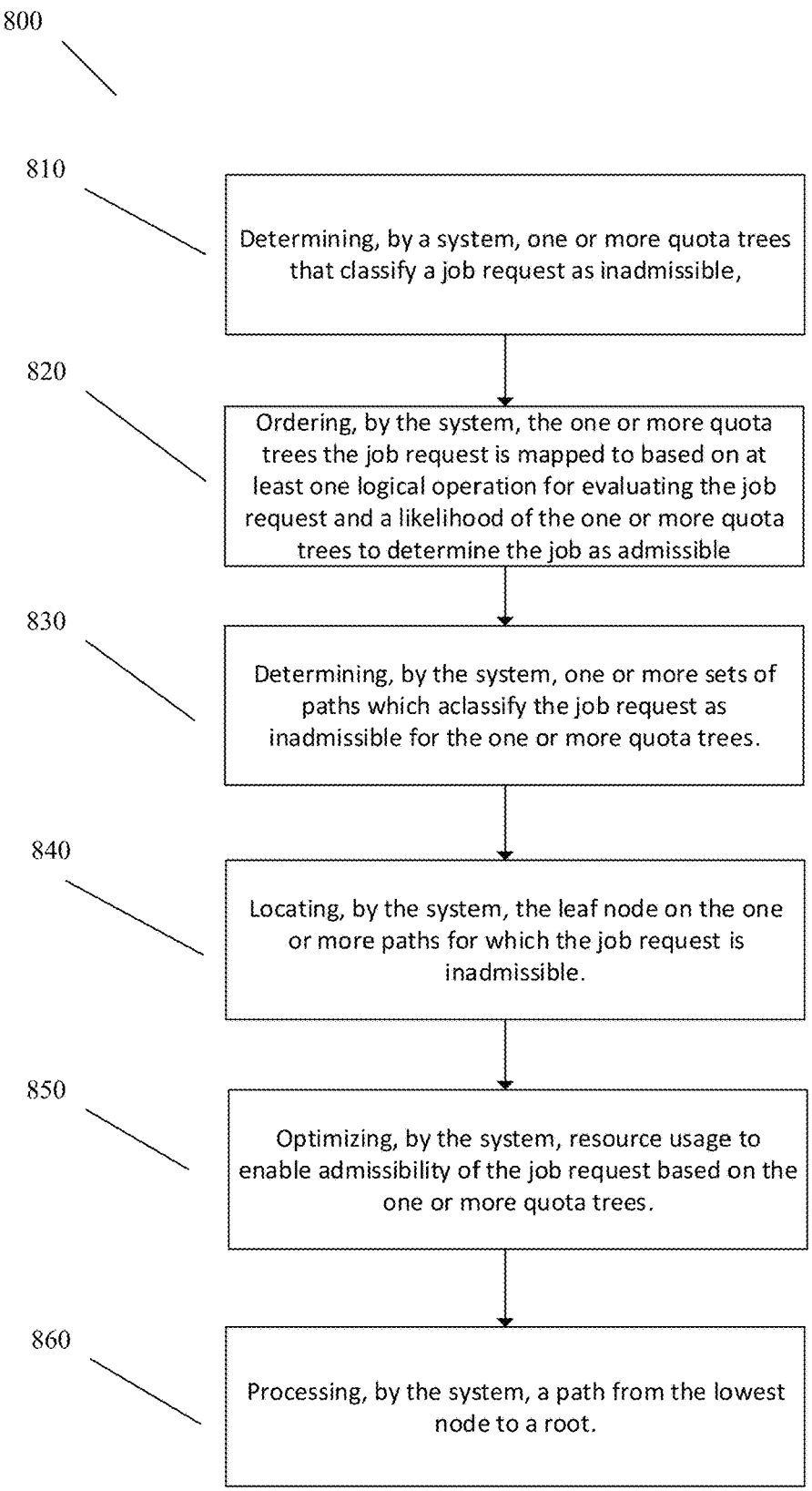
FIG. 8 illustrates a flow diagram of an example, non-limiting computer-implemented method that can facilitate optimization of resource usage based on quota trees in accordance with one or more embodiments described herein.

FIG. 8 illustrates a flow diagram of an example, non-limiting computer-implemented method 800 that can facilitate optimization of resource usage based on quota trees in accordance with one or more embodiments described herein. Repetitive description of like elements and/or processes employed in respective embodiments is omitted for sake of brevity.

At 810, computer-implemented method 800 can comprise determining, by a system (e.g., resource optimization system 201 and/or determination component 204) operatively coupled to a processor (e.g., processor 203), one or more quota trees that classify a job request as inadmissible.

At 820, computer-implemented method 800 can comprise ordering, by the system (e.g., resource optimization system 201 and/or ordering component 309), the one or more quota trees the job request is mapped to, based on at least one logical operation for evaluating the job request and a likelihood of the one or more quota trees to determine the job request as admissible. For example, if the logical operation for evaluating the job request is AND, then ordering component 309 can order the one or more quota trees in descending order of likelihood to reject the job request. In another example, if the logical operation for evaluating the job request is OR, then ordering component 309 can order the one or more quota trees in descending order of likelihood to accept the job request.

At 830, computer-implemented method 800 can comprise determining, by the system (e.g., resource optimization system 201 and/or inadmissibility component 306), one or more sets of paths which determine the job request as inadmissible for the one or more quota trees.

At 840, computer-implemented method 800 can comprise locating, by the system (e.g., resource optimization system 201 and/or location component 307), the leaf node on the one or more paths for which the job request is inadmissible.

At 850, computer-implemented method 800 can comprise optimizing, by the system (e.g., resource optimization system 201 and/or optimization component 205), resource usage to enable admissibility of the job request based on the one or more quota trees. For example, as described above in reference to FIGS. 2-4, optimization component can optimize resource usage at the leaf node located by location component 307 through a borrowing operation and/or a pre-emption operation.

At 860, computer-implemented method 800 can comprise processing, by the system (e.g., resource optimization system 201 and/or path component 308), a path from the leaf node to a root. For example, as described above in detail in reference to FIGS. 2-4, after optimization component 205 optimizes resource usage on the leaf node, path component 308 can signal optimization component 205 to optimize resource usage at the next node on the path from the leaf node to the root of the quota tree. This process can repeat until optimization component 205 reaches a node for which optimization is unsuccessful, or optimization component 205 successfully optimizes all nodes on the path to the root.

Resource optimization system 201 can provide technical improvements to a processing unit associated with resource optimization system 201. For example, in ordering the one or more quota trees based on a likelihood to reject or accept the job request, resource optimization system 201 can optimize resource usage without optimizing resource usage in each quota tree. For example, if the logical operation used to evaluate the job request is OR, resource optimization system 201 can stop the optimization process after one quota tree has been optimized to enable admissibility, as OR calls for at least one quota tree to be admissible to enable overall admissibility. As such, by ordering the one or more quota trees in descending likelihood of accepting the job, it is more likely that a quota tree will be optimized to be admissible in an earlier iteration, enabling the optimization process to stop earlier, and thereby reduce the workload of a processing unit (e.g., processing unit 203) that is employed to execute the routines (e.g., instructions and/or processing threads) involved in resource optimization.

A practical application of resource optimization system is that it can optimize resource usage across multiple quota trees, thereby allowing for the optimization and admissibility of job requests that otherwise would be inadmissible.

Resource optimization system 201 can employ hardware and/or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Resource optimization system 201 and/or components thereof, can be employed to solve new problems that arise through advancements in technologies mentioned above, employment of quantum computing systems, cloud computing systems, computer architecture, and/or another technology.

It is to be appreciated that resource optimization system 201 can utilize various combinations of electrical components, mechanical components, and circuitry that cannot be replicated in the mind of a human or performed by a human, as the various operations that can be executed by resource optimization system 201 and/or components thereof as described herein are operations that are greater than the capability of a human mind. For instance, the amount of data processed, the speed of processing such data, or the types of data processed by resource optimization system 201 can be greater, faster, or different than the amount, speed, or data type that can be processed by a human mind over the same period of time.

According to several embodiments, resource optimization system 201 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that resource optimization system 201 can include information that is impossible to obtain manually by an entity, such as a human user. For example, the type, amount, and/or variety of information included in resource optimization system 201, determination component 204, optimization component 205, inadmissibility component 306, location component 307, path component 308, and/or ordering component 309 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 9:
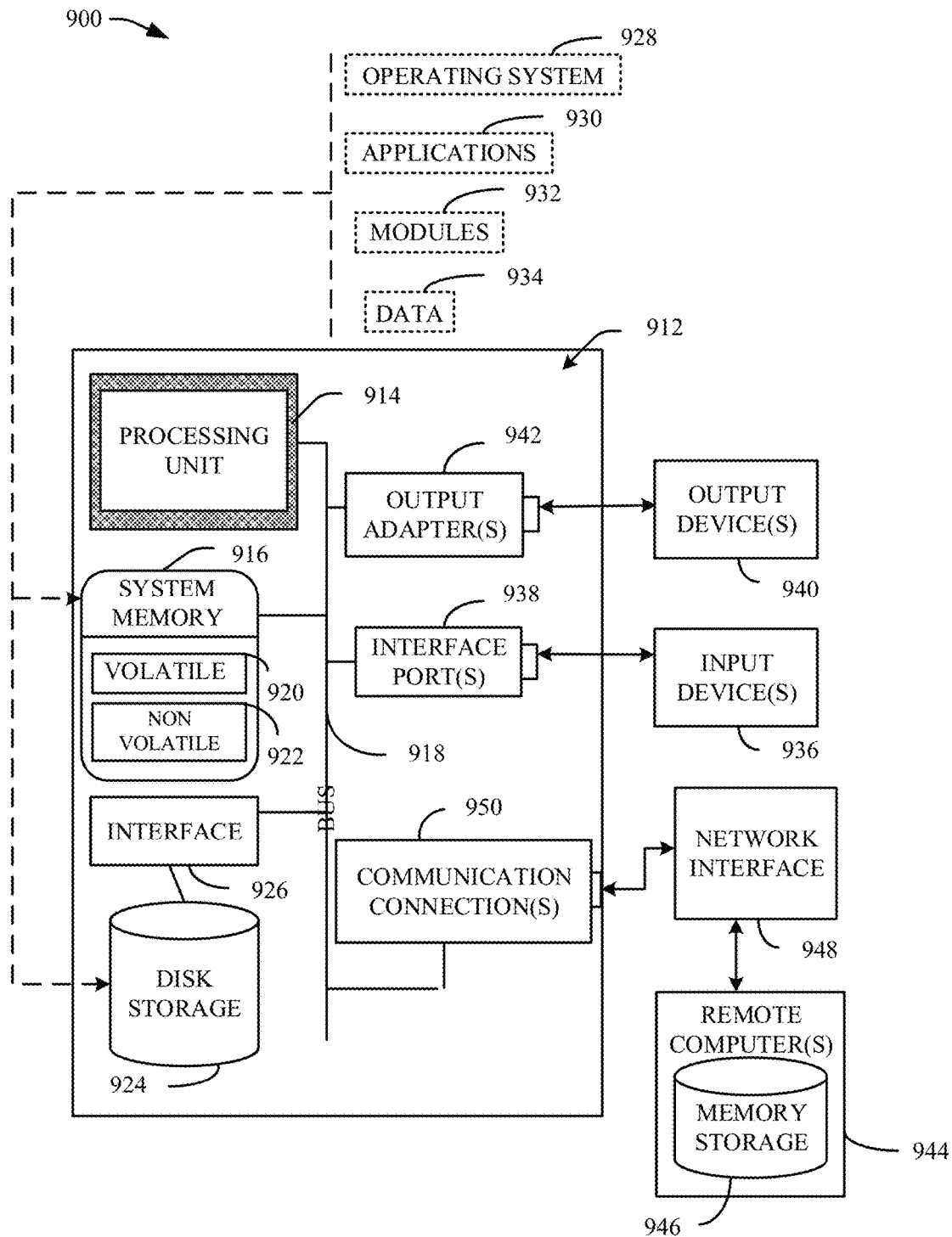
FIG. 9 illustrates a block diagram of an example, non-limiting operating environment in which one or more embodiments described herein can be facilitated.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Treeics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, and/or another wire and/or wireless communication network.

LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Figure 10:
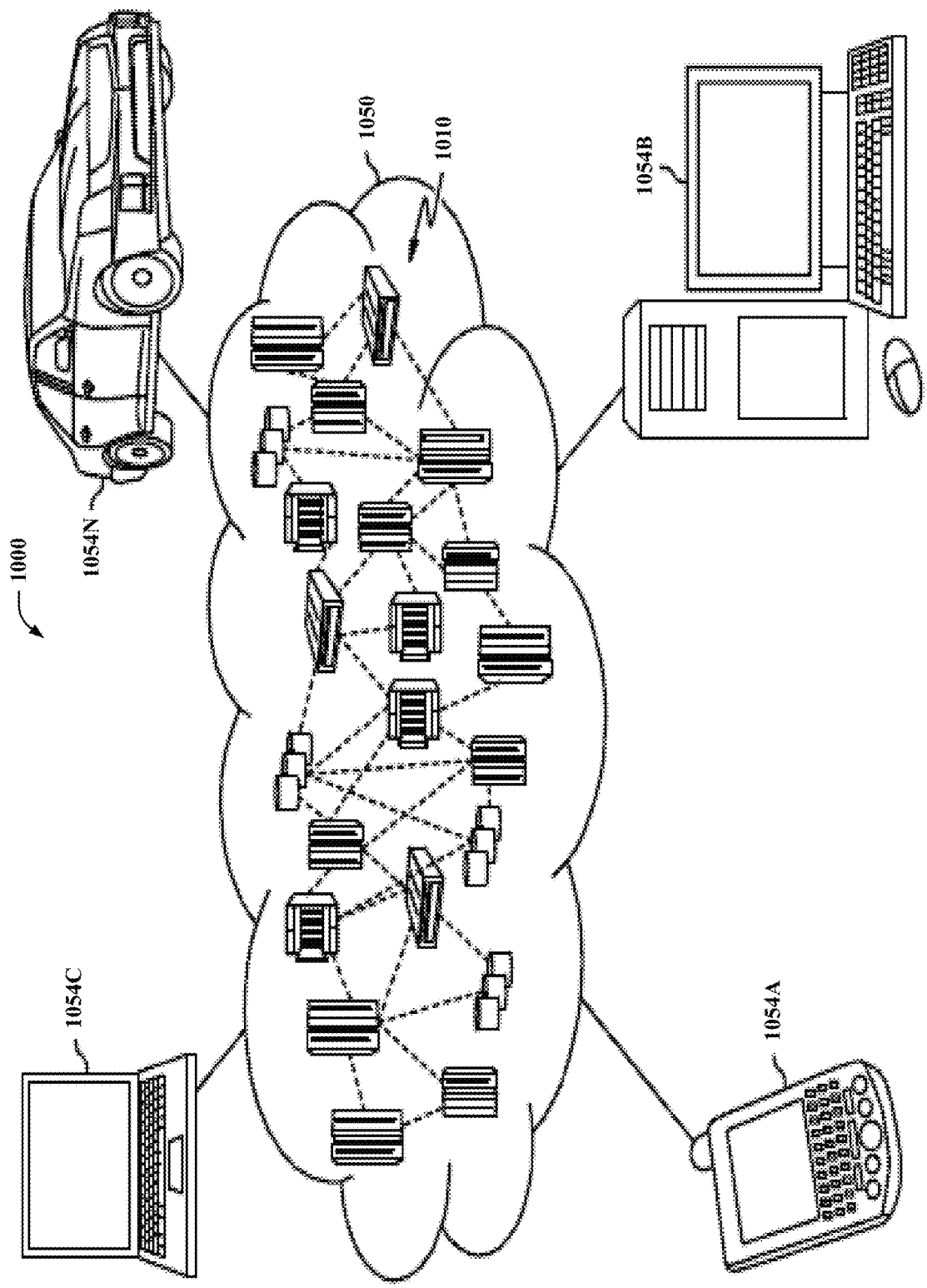
FIG. 10 illustrates a block diagram of an example, non-limiting cloud computing environment in accordance with one or more embodiments of the subject disclosure.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Although not illustrated in FIG. 10, cloud computing nodes 1010 can further comprise a quantum platform (e.g., quantum computer, quantum hardware, quantum software, and/or another quantum platform) with which local computing devices used by cloud consumers can communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a system operatively coupled to a processor, one or more quota trees that classify a job request as inadmissible, based on resource usage of the job request and resource availability;
   optimizing, by the system, resource usage to enable admissibility of the job request based on the one or more quota trees, wherein the optimization comprises borrowing resource quotas from one or more nodes in a quota tree of a node that the job request is mapped to; and
   executing, by the system, an admissible job request on one or more resource clusters based on the optimization.

2. The computer-implemented method of claim 1, further comprising:
   determining, by the system, one or more sets of paths which classify the job request as inadmissible for the one or more quota trees;
   locating, by the system, a leaf node on one or more paths for the one or more sets of paths for which the job request is inadmissible; and
   processing, by the system, a path from the leaf node to a root.

3. The computer-implemented method of claim 1, wherein the optimization takes into account one or more job request attributes, wherein the one or more job request attributes comprise the job request's priority, the job request's resource requirements, a comparison of the job request to a second job request, and/or properties of one or more quota trees.

4. The computer-implemented method of claim 1, wherein the optimization further comprises the job request pre-empting a second job request.

5. The method of claim 1, further comprising:
   ordering, by the system, the one or more quota trees the job request is mapped to based on at least one of: a logical operation for evaluating the job request on the one or more quota trees and a likelihood of the one or more quota trees to determine the job request as admissible.

6. The method of claim 5, wherein the ordering is based on properties of the one or more quota trees, the properties of the job request, and properties of one or more additional job requests mapped to the one or more quota trees.

7. A system, comprising:
   a memory that stores computer executable components; and
   a processor that executes computer executable components stored in memory, wherein the computer executable components comprise:
      a determination component that determines one or more quota trees that classify a job request as inadmissible, based on resource usage of the job request and resource availability; and
      an optimization component that optimizes resource usage to enable admissibility of the job request based on the one or more quota trees and executes an admissible job request on one or more resource clusters based on the optimization, wherein the optimization comprises borrowing resource quotas from one or more nodes in a quota tree of a node that the job request is mapped to.

8. The system of claim 7, further comprising:
an inadmissibility component that determines one or more sets of paths which classify the job request as inadmissible for the one or more quota trees;
a location component that locates a leaf node on one or more paths of the one or more sets of paths for which the job request is inadmissible; and
a path component that processes a path from the lowest node to a root.

9. The system of claim 7, wherein the optimization component takes into account one or more job request attributes, wherein the one or more job request attributes comprise the job request's priority, the job request's resource requirements, a comparison of the job request to a second job request, and/or properties of one or more quota trees.

10. The system of claim 7, wherein the optimization further comprises the job request pre-empting a second job request.

11. The system of claim 7, further comprising:
an ordering component that orders the one or more quota trees the job request is mapped to based on at least one logical operation for evaluating the job request on the one or more quota trees and a likelihood of the one or more quota trees to determine the job request as admissible.

12. The system of claim 11, wherein the ordering is based on properties of one or more quota trees, properties of the job request, and properties of one or more additional job requests mapped to the one or more quota trees.

13. A computer program product comprising a computer readable storage medium having program instructions embodied therewith, the program instructions executable by a processor to cause the processor to:
determine, by the processor, one or more quota trees that classify a job request as inadmissible, based on resource usage of the job request and resource availability;
optimize, by the processor, resource usage to enable admissibility of the job request based on the one or more quota trees, wherein the optimization comprises borrowing resource quotas from one or more nodes in a quota tree of a node that the job request is mapped to; and
execute, by the processor, an admissible job request on one or more resource clusters based on the optimization.

14. The computer program product of claim 13, wherein the program instructions are further executable by the processor to cause the processor to:
determine, by the processor, one or more sets of paths which classify the job request as inadmissible for the one or more quota trees;
locate, by the processor, a leaf node on one or more paths of the one or more sets of paths for which the job request is inadmissible; and
process, by the processor, a path from the leaf node to a root.

15. The computer program product of claim 13, wherein the optimization is takes into account one or more job request attributes, wherein the one or more job request attributes comprise the job request's priority, the job request's resource requirements, a comparison of the job request to a second job request, and/or properties of one or more quota trees.

16. The computer program product of claim 13, wherein the optimization further comprises the job request pre-empting a second job request.

17. The computer program product of claim 13, wherein the program instructions are further executable by the processor to cause the processor to:
order, by the processor, the one or more quota trees the job request is mapped to based on at least one logical operation for evaluating the job request on the one or more quota trees and a likelihood of the one or more quota trees to determine the job request as admissible.

* * * * *